US009126237B2

(12) United States Patent
Wilson

(10) Patent No.: US 9,126,237 B2
(45) Date of Patent: Sep. 8, 2015

(54) DEVICE STORAGE CASE

(71) Applicant: Roger Dale Wilson, Boise, ID (US)

(72) Inventor: Roger Dale Wilson, Boise, ID (US)

( * ) Notice: Subject to any disclaimer, the term of this patent is extended or adjusted under 35 U.S.C. 154(b) by 285 days.

(21) Appl. No.: 13/911,938

(22) Filed: Jun. 6, 2013

(65) Prior Publication Data
US 2013/0326829 A1    Dec. 12, 2013

Related U.S. Application Data

(60) Provisional application No. 61/657,105, filed on Jun. 8, 2012.

(51) Int. Cl.
| | |
|---|---|
| *B08B 1/02* | (2006.01) |
| *B08B 1/04* | (2006.01) |
| *A45C 11/00* | (2006.01) |
| *A45C 13/00* | (2006.01) |
| *A45C 15/00* | (2006.01) |
| *H04M 1/04* | (2006.01) |

(Continued)

(52) U.S. Cl.
CPC .................. *B08B 1/006* (2013.01); *A45C 11/00* (2013.01); *A45C 13/00* (2013.01); *A45C 15/00* (2013.01); *B08B 1/008* (2013.01); *B08B 1/02* (2013.01); *B08B 1/04* (2013.01); *G06F 1/1628* (2013.01); *A45C 2011/002* (2013.01); *A45C 2011/003* (2013.01); *B08B 2240/00* (2013.01); *G06F 2200/1633* (2013.01); *H04M 1/04* (2013.01)

(58) Field of Classification Search
CPC ............ B60S 1/006; B60S 1/008; B60S 1/02; B60S 1/04; B60S 2001/001–2001/003; A47L 23/263; A47L 23/02

USPC .......... 15/97.1, 104.8, 209.1, 160, 21.1, 88.3, 15/88.4, 25, 26, 34, 36, 77; 206/320; 455/575.8, 575.1–575.9, 90.3; 185/27–36

See application file for complete search history.

(56) References Cited

U.S. PATENT DOCUMENTS

| | | | | | |
|---|---|---|---|---|---|
| 732,373 | A | * | 6/1903 | Preuss | 15/36 |
| 902,390 | A | * | 10/1908 | Ford | 15/34 |
| 1,583,589 | A | * | 5/1926 | Grapentin | 15/36 |

(Continued)

FOREIGN PATENT DOCUMENTS

| | | | | | |
|---|---|---|---|---|---|
| GB | | 2505044 A | * | 2/2014 | A45C 11/00 |
| JP | | 11299521 A | | 11/1999 | |

(Continued)

*Primary Examiner* — Mark Spisich
*Assistant Examiner* — Andrew A Horton
(74) *Attorney, Agent, or Firm* — JP Webb; Jason P. Webb; Danny Y. H. Cheng

(57) ABSTRACT

There is a device storage case including a housing having a device access aperture. The device storage case includes a device engagement mechanism coupled to the housing and configured to convert mechanical power derived through user interaction with deposition of a device through the device access aperture to a form usable by the device storage case. The device storage case includes a surface cleaning mechanism configured to clean a surface of a device disposed within the housing, and functionally coupled to the device engagement mechanism such that the device engagement mechanism powers operation of the surface cleaning device. The surface cleaning mechanism includes a plurality of rollers functionally coupled to the device engagement mechanism and configured to clean a surface of the device when powered by the device engagement mechanism.

13 Claims, 5 Drawing Sheets

(51) Int. Cl.
    *B08B 1/00*     (2006.01)
    *G06F 1/16*     (2006.01)

(56) References Cited

U.S. PATENT DOCUMENTS

| | | |
|---|---|---|
| 2,775,778 A | 1/1957 | Mattson |
| 3,343,658 A | 9/1967 | Renwick |
| 3,369,651 A | 2/1968 | Crowley |
| 4,269,306 A | 5/1981 | Feniger |
| 5,550,564 A | 8/1996 | Cragun |
| 6,170,651 B1 | 1/2001 | Taormina |
| 6,338,350 B1 | 1/2002 | Ewen |
| 6,439,379 B2 | 8/2002 | Taormina |
| 6,923,313 B1 * | 8/2005 | Orogun-Thomas ............... 206/5 |
| 7,545,370 B1 | 6/2009 | Langgood et al. |
| 7,546,657 B2 | 6/2009 | Gurley |
| 2004/0166910 A1 | 8/2004 | Ha et al. |
| 2005/0265771 A1 | 12/2005 | Lord et al. |
| 2006/0232912 A1 | 10/2006 | Lin |
| 2007/0287515 A1 | 12/2007 | Fagrenius et al. |
| 2008/0257921 A1 * | 10/2008 | Chauhan ...................... 224/191 |
| 2009/0286581 A1 * | 11/2009 | Hsiao ......................... 455/575.8 |
| 2010/0182738 A1 | 7/2010 | Visser et al. |
| 2011/0186076 A1 | 8/2011 | Appleton |
| 2012/0043231 A1 | 2/2012 | Perrier et al. |
| 2012/0138490 A1 | 6/2012 | Hollander et al. |
| 2013/0192635 A1 * | 8/2013 | Lee ................................. 134/6 |

FOREIGN PATENT DOCUMENTS

| | | |
|---|---|---|
| WO | 0000304 | 1/2000 |
| WO | 2007140822 | 12/2007 |

* cited by examiner

DEVICE STORAGE CASE

CROSS-REFERENCE TO RELATED APPLICATIONS

This invention claims priority, under 35 U.S.C. §120, to the U.S. Provisional Patent Application No. 61/657,105 to Roger Dale Wilson filed on Jun. 8, 2012, which is incorporated by reference herein.

BACKGROUND OF THE INVENTION

1. Field of the Invention

The present invention relates to cleaning devices, specifically to a cleaning device that cleans the screen of an electronic device.

2. Description of the Related Art

Electronic devices are an ever increasing presence in our personal lives. As technology has reduced in size it has become easier and easier to incorporate more functions and devices into small hand-held mobile devices. These devices are often in contact with our faces and hands, but are also shared with others and sometimes displayed to others.

When a device is held in hand or placed against the skin, oils and other materials from the skin transfer to the surface of the device. Since these devices often have displays and other highly visible components, the oils and other materials are also readily visible. Additionally, since these mobile devices are generally used personally, sharing the device may result in materials from others being left as residue on the surface of the device. This is unsightly in the least and generally unhygienic as it may contribute to the spread of disease or illness. Accordingly, cleaning these devices, at least of surface residue is of importance.

Some improvements have been made in the field. Examples of references related to the present invention are described below in their own words, and the support teachings of each reference are incorporated by reference herein:

U.S. Pat. No. 7,546,657, issued to Gurley, discloses a cleaning tool for cleaning mobile electronic devices includes a base member which is manufactured from a first predetermined material and which has a cleaning portion and an elongated handle portion which is attached to and extends from the cleaning portion. A cleaning member is manufactured from a second predetermined material and is attached to the cleaning portion. As second cleaning member may be attached to a free end of the handle portion which is preferably tapered.

U.S. Pat. No. 7,545,370, issued to Langgood et al., discloses an apparatus for automatic cleaning of a portable computing device, comprises at least one display surface of a portable device, a housing in the portable computing device adjacent to the display surface, an enclosed cavity located in the housing, a cleaning device located in the enclosed cavity, a mechanism for moving the cleaning device during cleaning, and a controller to initiate the cleaning.

U.S. Pat. No. 6,439,379, issued to Taormina, discloses a multi-purpose eyeglass holding and cleaning kit capable of storing a pair of eyeglasses and including a body with an outer shell constructed of a durable material, the body having a selected length, width and thickness which defines a generally elongate article with a first end and a second end and defining, in combination, a hollow interior suitable for receiving in inserting fashion the pair of the eyeglasses. A hingedly secured portion is secured to the body at a desired location and is actuated from a closed position to an open position in order to reveal an interior of the shell interior and to permit the insertion or removal of the pair of eyeglasses. A volume of a glass lens cleaning solution is contained within the shell at a selected location, the cleaning solution further including a dispensing pump incorporated within the body. A flap defined on an inner face of the shell interior supports a fabric material is contained within the shell. When the pair of eyeglasses are removed from the body, the dispensing pump is employed in a first step to apply cleaning solution to the surfaces of the eyeglass lenses and the fabric material is removed from the flap and employed in a second step to wipe dry the solution from the cleaned lenses.

U.S. Patent Application Publication No. 2011/0186076, by Appleton, discloses a method of cleaning a skin-contacting surface associated with a hand-held device includes providing a substantially dry, porous, thermoplastic wipe, contacting the skin-contacting surface with the wipe, and moving the wipe relative to the surface while the wipe is in contact with the surface.

U.S. Patent Application Publication No. 2007/0287515, by Fagrenius et al., discloses radiotelephones, having self-cleaning display screens are provided. A radiotelephone includes a first housing portion having a display screen located thereon. A second housing portion is movably connected to the first housing portion, and the first and second housing portions are movable relative to one another between a closed position and an open position. An elongated cleaning member is movably secured to the first housing portion, and is configured to wipe the display screen in response to movement of the first and second housing portions between the open and closed positions.

The inventions heretofore known suffer from a number of disadvantages which include requiring many actions to clean, being uncomfortable, requiring substantial effort, being bulky, being large, taking a long time to operate, being difficult to use, requiring additional effort or movements, requiring additional structures, not being compact, cleaning only occasionally, not cleaning on both insertion and extraction, requiring the user to carry a cleaning cloth, failing to protect clothes from soiling from soiled devices, and/or failing to protect the screen of a device from damage/wear.

What is needed is a device storage case that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available device storage case. Accordingly, the present invention has been developed to provide a device storage case to effectively and efficiently clean a screen of a device.

According to one embodiment of the invention, there is a device storage case that may include a housing that may have a device access aperture. The housing may include a clip that may be coupled to an exterior surface of the housing and may be configured to selectably couple to a user.

The device storage case may include a device engagement mechanism that may be coupled to the housing and may be configured to convert mechanical power derived through user interaction with deposition of a device through the device access aperture to a form usable by the device storage case.

The device storage case may include a surface cleaning mechanism that may be configured to clean a surface of a device that may be disposed within the housing, and may be functionally coupled to the device engagement mechanism such that the device engagement mechanism powers operation of the surface cleaning device. The surface cleaning mechanism may include a plurality of rollers that may be functionally coupled to the device engagement mechanism and may be configured to clean a surface of the device when powered by the device engagement mechanism. The plurality of rollers may include cleaning pads that may be configured to clean a surface of the device. The surface cleaning mechanism may include a mechanical power drive band that may be coupled to the plurality of rollers such that the mechanical power drive may cause the plurality of rollers to rotate. The device engagement mechanism may include a loading mechanism that may be configured to store mechanical energy from only the movement of inserting or removing of a device from the device access aperture of the housing into a form of potential energy that may later be harnessed by the surface cleaning mechanism. The device engagement mechanism may include a bias member that may be functionally coupled to the surface cleaning mechanism and may be configured to convert mechanical power derived through user interaction with deposition of a device through the device access aperture into potential energy stored within the bias member. The surface cleaning mechanism may include a trigger mechanism that may be configured to activate delivery of potential energy stored in the device engagement mechanism to the surface cleaning mechanism and thereby clean a surface of a device engaged with the housing.

The device storage case may include a locking mechanism that may be disposed within the housing and may be configured to lock a device inside the housing.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, amore particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
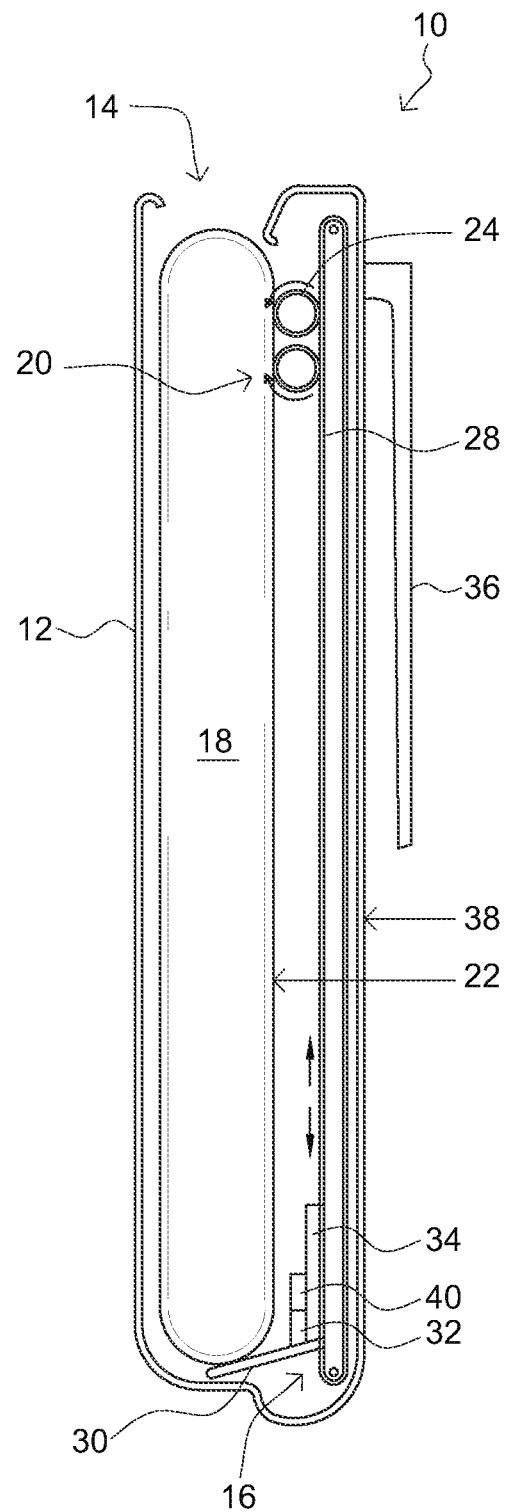
FIG. 1 is a side elevational cross-sectional view of a device storage case, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant an and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented programmable hardware devices such as field programmable gate arrays, programmable army logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any any use of similar or identical language characterizing each embodiment. Therefore, here one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of"

FIG. 1 is a side elevational cross-sectional view of a device storage case, according to one embodiment of the invention. There is shown a device 18 disposed within a device storage case 10 including a housing 12, a device engagement mechanism. 16, and a surface cleaning mechanism 20, and a clip 36. The illustrated device storage case is configured to receive a device (generally a hand-held electronic device such as but not limited to a cell-phone, smartphone, tablet, and/or etc.) therein for storage and simultaneous cleansing of one or more of its surfaces so that once withdrawn in from the storage case, the device surface will be cleansed and ready for use.

The illustrated device storage case 10 is configured to clean a surface of a device when inserted and/or when removed from the case 10. In particular, the surface may be cleansed during any of the following stages: during insertion of the device into the case, while stored inside the case, and during retraction from the case. Such cleaning is powered/activated either directly or indirectly by the motion(s) of insertion and/or retraction of the device into/from the case.

The device storage case 10 includes a housing 12 having a device access aperture 14. The housing 12 may be of a great variety of housing types, configurations, constructions and materials. Often such cases are semi-rigid pouch shaped structures made of leather, plastic, fabric, rubber and/or combinations, layers, and/or composites thereof. The case generally has an opening (aperture) at the top or side of the case housing whereby a user may dispose contents into and may remove contents therethrough. The aperture is generally sized slightly larger than the cross-sectional size and shape of the intended contents so that the contents may be slipped easily into the case through the aperture and so that a user's fingers may enter into the case to grip and retract the device. The housing may include one or more rigid structural components, such as but not limited to mounting plates for clips and/or other structures included with and/or associated with the housing. The illustrated housing includes (not shown) structural support for the clip 36 and for the device engagement mechanism 16 and surface cleaning mechanism 20 so that they may be fixed to an interior of the housing and remain therein and in position no that their function may be repeated as needed.

The illustrated housing 12 includes a clip 36 coupled to an exterior surface 38 of the housing 12 and configured to selectably couple to a user. The clip 36 is configured to couple to an exterior surface of the housing and configured to selectably attach to a desired object or person. The clip 36 may include, but not limited to: a clip, a hook, a hook and loop attachment device, magnets, latches, clasps, anchors, etc. Generally the clip is an L-shaped structure coupled to the housing and extending outwardly and downwardly as illustrated so that it may hook onto another structure such as a belt or waistband of a user and thereby couple the housing thereto.

The device storage case 10 includes a device engagement mechanism 16 coupled to the housing 12 and configured to convert mechanical power derived through user interaction with deposition of a device 18 through the device access aperture 14 to a form usable by the device storage case 10. The illustrated device engagement mechanism 16 is shaped and positioned in an interior of the housing such that when an appropriate device is placed through the aperture 14 the device engages with the device engagement mechanism, generally by pressing against a surface of the device engagement mechanism, such as but not limited to a tip or flange of the device engagement mechanism that extends into the usable space within the housing. As the device is pushed further into the interior of the housing, the lip/flange/etc. is displaced into a lower and lower position. The lip/flange/etc. is coupled to an energy storage mechanism, such as but not limited to a pulley system, bias member (spring, etc.), hydraulic system, pressurized air system and the like and combinations thereof, such that as the lip/flange/etc. is towered, such mechanical energy is stored, transferred, and/or converted into a form usable by the surface cleaning mechanism 20 such that the surface cleaning mechanism 20 cleans or is prepared to clean a surface of the device. Such an energy storage mechanism is functionally coupled to the surface cleaning mechanism and such coupling structure may include but is not limited to systems of and/or individual pulleys, belts, fluid hoses, fluid containers, triggers, pins, flanges, lips, screws, shafts, axles, levers, and the like and combinations thereof. Energy transfer from the device engagement mechanism to the surface cleaning mechanism may be immediate, time delayed, and/or reserved until a triggering condition is met, such as but not limited to the lip/flange reaching a bottom region of the housing, the device being pulled out, a predetermined period of time elapsing, and/or etc. There may be triggering and/or coupling structures (physical and/or electronic) configured to effectuate such timing. There may be selectable settings that may be mechanical and/or electronic that may alter the timing and/or other characteristics of the energy transfer to the surface cleaning mechanism.

The illustrated device engagement mechanism 16 includes a loading mechanism (lip/flange) 30 configured to engage with the device as it is inserted and/or removed from the housing and thereby permit the case to store mechanical energy from only the movement of inserting or removing of the device 18 from the device access aperture 14 of the housing 12 into a form of potential energy that later is harnessed by the surface cleaning mechanism 20. The illustrated device engagement mechanism 16 includes a bias member 34 functionally coupled to the surface cleaning mechanism 20 and configured to convert mechanical power derived through user interaction with deposition of the device 18 through the device access aperture 14 into potential energy stored within the bias member 34.

The device storage case 10 includes a surface cleaning mechanism 20 configured to clean a surface 22 of the device 18 disposed within the housing 12, and functionally coupled to the device engagement mechanism 16 such that the device engagement mechanism 16 powers operation of the surface cleaning mechanism 20. The illustrated surface cleaning mechanism 20 includes a plurality of rollers 24 functionally coupled to the device engagement mechanism 16 and configured to clean the surface 22 of the device 18 when powered by the device engagement mechanism 16. The surface cleaning mechanism 20 includes a mechanical power drive band 28 coupled to the plurality of rollers 24 such that the mechanical power drive band 28 causes the plurality of rollers 24 to rotate, thereby cleaning the surface 22 of the device 18. The drive band 28 is functionally coupled to the device engagement mechanism such that the drive band may be actuated with energy from the device engagement mechanism. In one non-limiting example, the device engagement mechanism includes a spring-loaded pulley system with ratcheting connection to the drive band such that as the lip is pressed lower into the housing, the pulley system causes the drive band to simultaneously rotate in one direction and when the device is removed from the housing, the spring causes the lip to rise while causing a reversal in the spin, that because of the ratcheting connection between the device engagement mechanism and the drive band, the reverse spin is not experienced by the drive band (in another embodiment it does rotate in the opposite direction, thus cleaning on entry and on exit).

According to one embodiment of the invention, the device storage case 10 is configured to clean an exterior surface 22, such as a screen, of a phone or electronic device 18, such as but not limited to smart phones, cell phones, tablet computers, notebook computers, kiosk screens, mp3 players, and the like and combinations thereof. The device storage case 10 includes a housing 12 configured support and contains the components and mechanisms of the device storage case 10. The housing 12 includes a hard exterior shell configured to protect a device 18 when disposed therein. The housing 12 includes a cavity configured to receive a device, such as a phone, wherein the cavity is configured to be sized and shaped to encase the device. The housing 12 includes a device access aperture 14 disposed about a top end of the housing and in communication with the cavity. The aperture 14 is configured to be sized and shaped to receive the device, wherein the device is configured to be disposed therethrough and into the cavity. The housing 12 includes a clip 36 extending from a back exterior surface 38 of the housing. The clip 36 is configured to couple to a belt or waist area of a user and is configured to position the housing 12 in an upright configuration.

The illustrated device storage case 10 includes a pair of rollers 24 configured to clean a surface or screen of a device or phone. The illustrated pair of rollers 24 each includes cleaning pads 26 configured to clean a surface 22 or screen of a phone or electronic device 18. Such cleaning pads are generally soft and/or absorbent materials such as but not limited to natural and/or artificial textiles, such as but not limited to microfiber, cotton, wool, nylon, and the like and combinations thereof. The pair of rollers 24 are coupled to a mechanical power drive band 28 disposed within the housing 12, wherein the band 28 is configured to rotate the pair of rollers 24. The mechanical power drive band 28 is positioned vertically within the housing 12 and the pair of rollers 24 are disposed about a top portion thereof. The band 28 is configured to rotate the pair of rollers 24 across the screen of the device, thereby cleaning the surface 22 of the device in contact with the pair of rollers 24.

The illustrated mechanical power drive band 28 is coupled to a loading mechanism 30 of a device engagement mechanism 16, wherein the loading mechanism 30 is disposed about a bottom portion of the housing 12. The loading mechanism 30 is configured to provide mechanical motion to the band 28 and, therefore, also to the pair of rollers 24 when actuated. The loading mechanism 30 is configured to store and generate energy from the movement of inserting and removing the device from the cavity of the housing 12.

The illustrated mechanical power drive band 28 is also coupled to a locking mechanism 32 configured to lock and unlock the device from the cavity of the housing 12. The locking mechanism 32 includes a trigger mechanism 40 is configured to provide push lock and push unlock capabilities to the device storage case 10. The locking mechanism 32 is configured to engage the device, once the device is completely disposed within the housing 12, thereby locking the device into position. The locking mechanism 32 is configured to unlock the device, by pressing downwardly thereon, thereby unlocking the device from the locking mechanism 32 and accessible through the device access aperture 14 of the housing 12.

According to one embodiment of the invention, there is an electronic triggering mechanism, which may be remote from the case, configured to trigger the surface cleaning mechanism to clean a surface of the device once activated. The electronic triggering mechanism may be voice activated or be included in an electronic application controlled via a remote. The electronic triggering mechanism may be configured to activate the surface cleaning mechanism upon activation or on a remote timing mechanism configured to periodically clean the device stored in the case.

In operation of one embodiment of the invention, there is a user having a device and a device storage case 10 coupled about a belt or waist of the user by a clip. The user positions the device, wherein a screen of the device is facing a pair of rollers disposed within the device storage case 10. The user inserts the device into a device access aperture of the device storage case 10 and into a cavity disposed therein. The user locks the device within the cavity by pressing the device completely into the cavity and engaging a locking mechanism. The device engagement mechanism is disposed within the device storage case 10 and configured to generate and store energy from the disposition of the device into and out of the device storage case 10. The device engagement mechanism is configured to provide mechanical movement to a mechanical power drive band coupled to a pair of rollers. The pair of rollers are configured to clean a surface, such as a screen, of the device when either inserted or removed from the cavity of the device storage case 10.

In one non-limiting example there is a housing 12 with an active/mechanized wiping structure that is powered by actions of the user in storing an electronic device. There may be one or more anti-microbial agents, cleansing agents, friction enhancing surfaces, and the like and combinations thereof on or associated with the wiping structure that enhance the benefits thereof. There may be a fluid container functionally coupled to the device engagement mechanism and/or to the surface cleaning mechanism that may include a dispensing mechanism, such as but not limited to a pump, that may be powered by the device engagement mechanism and/or may be triggered by one or more of inserting the device into the housing, the device reaching a particular position within the housing, the device being withdrawn from the housing, and/or the surface cleaning mechanism performing, initiating and/or completing one or more cleaning phases. The wiping structure may use the same general movements that a user may already perform in storing the device to power the wiping structure, such as hut not limited to inserting the device, extracting the device and/or positioning the device.

In another non-limiting embodiment, there is a spring mechanism in a thin housing 12 that as you push the device into the housing 12 it collects energy of the movement (springs, etc.) and when it reaches the bottom portion of the housing 12 there is a trigger device that releases the stored energy into a wiping structure which then cleanses the screen. Such may include a non-linear or angled (with respect to the position of the spring) track that the tip/flange rides or other structure that causes a coupling between the spring and a lip/flange to fail at some point along the travel path of the tip. Such may engage with the device and then allow for a disconnect such that when the lip reaches a particular portion of the track, the lip is displaced away from engagement with the spring and therefore the spring is allowed to return to its original position, thereby releasing energy to the surface cleaning mechanism or some other portion of the case.

In still another non-limiting embodiment, there is a roller across the top of a device that is driven by action of the device going into a housing 12. Such may roll against or with the motion of the device and such may pinch or otherwise apply pressure to the device by the wiping structure.

In still a further non-limiting embodiment, there may be a squeegee or rolling pin-type structure that may start near a bottom portion of the housing 12 that moves in opposition to the insertion movement of the device into the housing 12 by action of a plate engaged with a bottom portion of the device that travels downward and is functionally coupled to the squeegee or rolling-pin type structure.

In yet more embodiments, there may be a cleaning structure, such as hut not limited to a roller, wiper blade, pad, squeegee, cloth strip, pad or the like or combinations thereof coupled to a trigger structure that may selectably engage with an electronic device to be inserted and/or extracted from a housing, the trigger structure such as but not limited to a plate, spring, lever, roller, gear, elastic band, belt, channeled gripping structure or the like and combinations thereof that may be associated and/or functionally coupled to a energy transference structure configured to transfer energy associated with the movement of the electronic device to the cleaning structure and/or trigger such that the electronic device may be so cleansed, such as but not limited to a gear, pulley, firing structure, level, spring, pivot, hydraulics, axle, gears, belts, sprockets, and the like and combinations thereof.

Figure 2:
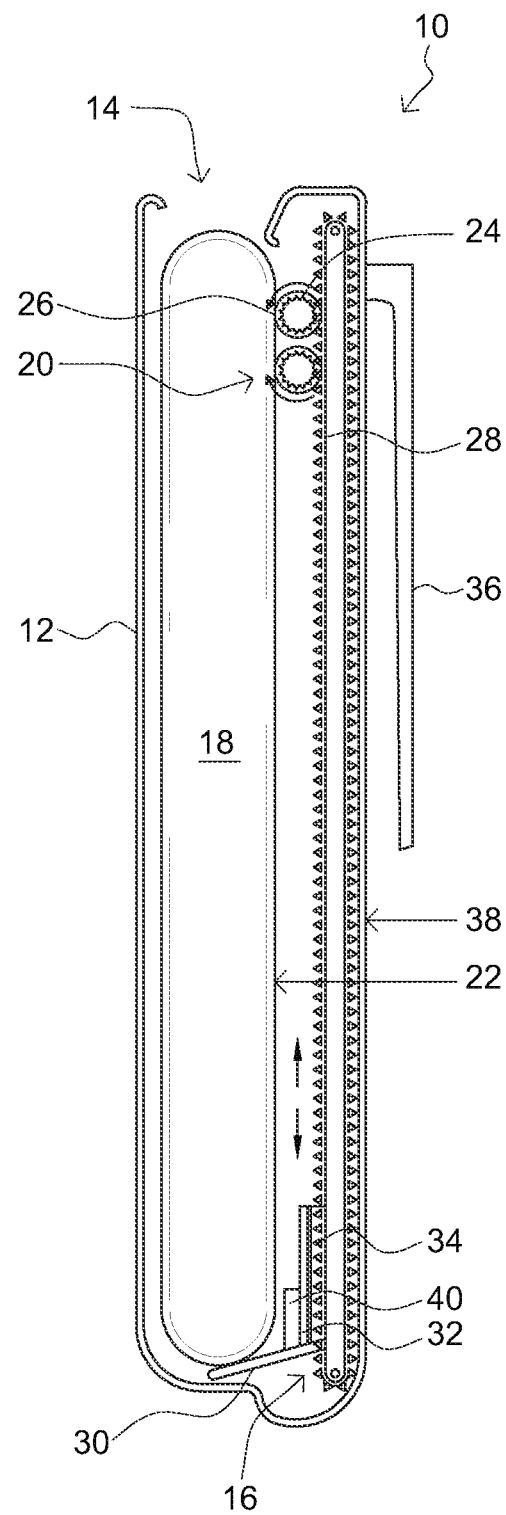
FIG. 2 is a side devotional cross-sectional view of a device storage case, according to one embodiment of the invention.

FIG. 2 is a side elevational cross-sectional view of a device storage case, according to one embodiment of the invention. There is shown a device 18 disposed within a device storage case 10 including a housing 12, a clip 36, a device engagement mechanism 16, and a surface cleaning mechanism 20. The surface cleaning mechanism 20 and the device engagement mechanism are functionally coupled by a geared drive band that engages with gears on the illustrated rollers.

The illustrated device storage case 10 is configured to clean a surface of a device when inserted and removed from the case 10. The device storage case 10 includes a housing 12 having a device access aperture 14. The illustrated housing 12 includes a clip 36 coupled to an exterior surface of the housing 12 and configured to selectably couple to a user.

The device storage case 10 includes a device engagement mechanism 16 coupled to the housing 12 and configured to convert mechanical power derived through user interaction with deposition of a device 18 through the device access aperture 14 to a form usable by the device storage case 10.

The device storage case 10 includes a surface cleaning mechanism 20 configured to clean a surface 22 of the device 18 disposed within the housing 12, and functionally coupled to the device engagement mechanism 16 such that the device engagement mechanism 16 powers operation of the surface cleaning mechanism 20. The illustrated surface cleaning mechanism 20 includes a plurality of rollers 24 functionally coupled to the device engagement mechanism 16 and configured to clean the surface 22 of the device 18 when powered by the device engagement mechanism 16. The illustrated plurality of rollers 24 includes cleaning pads 26 configured to clean a surface of the device 18. The surface cleaning mechanism 20 includes a mechanical power drive band 28 coupled to the plurality of rollers 24 such that the mechanical power drive band 28 causes the plurality of rollers 24 to rotate, thereby cleaning the surface 22 of the device 18. The device engagement mechanism 16 includes a loading mechanism 30 configured to store mechanical energy from only the movement of inserting or removing of the device 18 from the device access aperture 14 of the housing 12 into a form of potential energy that later is harnessed by the surface cleaning mechanism 20. The illustrated device engagement mechanism 16 includes a bias member 34 functionally coupled to the surface cleaning mechanism 20 and configured to convert mechanical power derived through user interaction with deposition of the device 18 through the device access aperture 14 into potential energy stored within the bias member 34.

According to one embodiment of the invention, there is a device storage case 10 including a plurality of rollers 24 configured to clean a surface or screen 22 of a phone or electronic device 18. The illustrated a plurality of rollers 24 includes cleaning members configured to wipe/brush debris from a surface of an electronic device. The device storage case 10 includes a mechanical power drive band 28 vertically disposed within the housing 12 and coupled to the plurality of rollers 24. The mechanical power drive band 28 is configured to provide vertical movement to the plurality of rollers 24.

The device storage case includes a loading mechanism 30 disposed about a bottom portion of the housing 12 and configured to provide stored energy to the mechanical power drive band 28. The loading mechanism 30 is configured to store energy from the disposition of the device through a device access aperture 15 and into the cavity of the housing 12. The device 18 is configured to push down or actuate the loading mechanism by compressing a bias member 34 disposed therein. When the device 18 is released from the cavity of the housing 12, energy is released to the mechanical power drive band 28, thereby providing vertically movement the plurality of rollers 24 and cleaning/wiping the screen or surface of the phone or electronic device while being removed from the housing 12. The device storage case 10 may be configured to clean the phone or electronic device upon entering the cavity or during removal from the cavity. In addition, the device storage case 10 may be configured to clean the phone or electronic device twice, once upon entering the cavity and another time during removal from the cavity of the housing.

The device storage case 10 includes a locking mechanism 32 disposed about a bottom portion of the housing 12 and configured to lock and unlock a phone or electronic device from the cavity of the housing 12. The locking mechanism 32 is in communication with the loading mechanism 30 and the mechanical power drive band 28, wherein the locking mechanism 32 initiates or ends the movement of the mechanical power drive band 28, and thereby initiating the pi of rollers 24. The locking mechanism 32 includes a trigger mechanism 40 is configured to provide push lock and push unlock capabilities to the device storage case 10.

Figure 3:
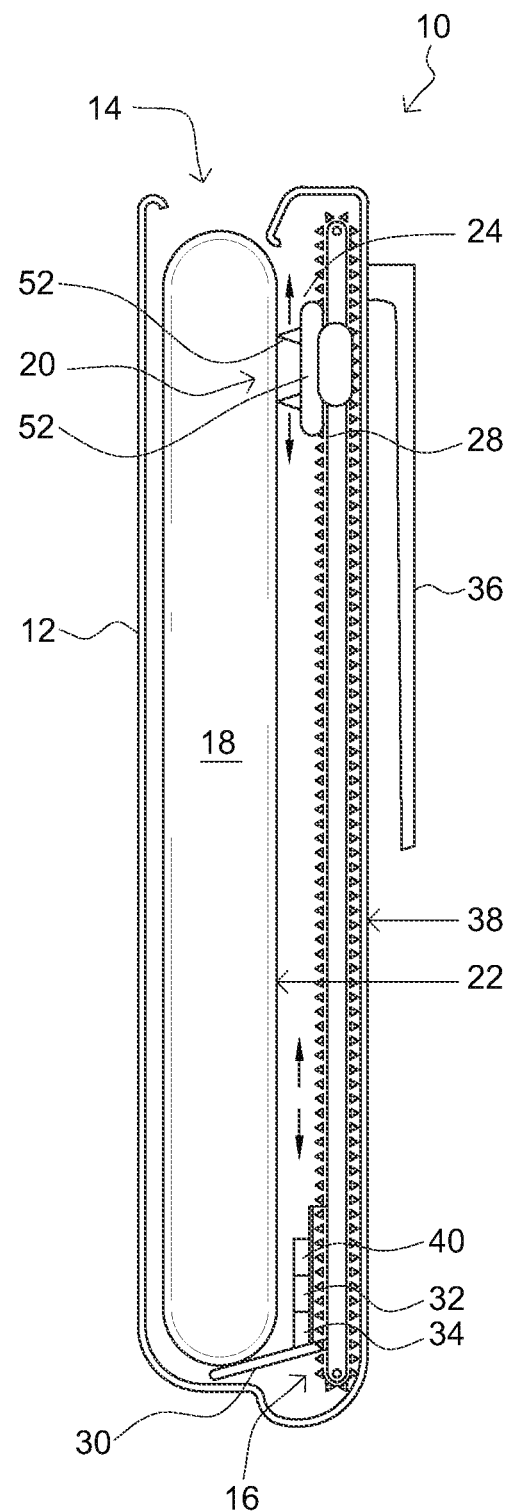
FIG. 3 is a side devotional cross-sectional view of a device storage case, according to one embodiment of the invention.

FIG. 3 is a side elevational cross-sectional view of a device storage case, according to one embodiment of the invention. There is shown a device 18 disposed within a device storage case 10 including a housing 12, a device engagement mechanism 16, a surface cleaning mechanism 20, a loading mechanism 30, a locking mechanism 32, a mechanical power drive band 28, and a pair of cleaning members 50. The illustrated surface cleaning mechanism 20 includes a pair of cleaning members 50 that are caused to travel up/down the surface of the device and thereby clean the surface similar to how windshield wipers clean a surface of a windshield.

The illustrated device storage case 10 is configured to clean a surface of a device 18 when inserted and removed from the case 10. The device storage case 10 includes a housing 12 having a device access aperture 14. The illustrated housing 12 includes a clip 36 coupled to an exterior surface of the housing 12 and configured to selectably couple to a user.

The device storage case 10 includes a device engagement mechanism 16 coupled to the housing 12 and configured to convert mechanical power derived through user interaction with deposition of a device 18 through the device access aperture 14 to a form usable by the device storage case 10.

The device storage case 10 includes a surface cleaning mechanism 20 configured to clean a surface 22 of the device 18 disposed within the housing 12, and functionally coupled to the device engagement mechanism 16 such that the device engagement mechanism 16 powers operation of the surface cleaning mechanism 20. The illustrated surface cleaning mechanism 20 includes a pair of cleaning members 50 functionally coupled to the device engagement mechanism 16 and configured to clean the surface 22 of the device 18 when powered by the device engagement mechanism 16. The surface cleaning mechanism 20 includes a mechanical power drive band 28 coupled to the pair of cleaning members 50 such that the mechanical power drive band 28 causes the pair of cleaning members to slide vertically up and down, thereby cleaning the surface 22 of the device 18. The device engagement mechanism 16 includes a loading mechanism 30 configured to store mechanical energy from only the movement of inserting or removing of the device 18 from the device access aperture 14 of the housing 12 into a form of potential energy that later is harnessed by the surface cleaning mechanism 20. The illustrated device engagement mechanism 16 includes a bias member 34 functionally coupled to the surface cleaning mechanism 20 and configured to convert mechanical power derived through user interaction with deposition of the device 18 through the device access aperture 14 into potential energy stored within the bias member 34.

According to one embodiment of the invention, there is a device storage case 10 configured to clean a screen of a device 18 or phone. The device storage case 10 includes a housing 12 having a clip 36 coupled to an exterior surface of the housing 12. The clip 36 is configured to couple to a user in an upright position. The device storage case 10 includes a pair of cleaning members 50 configured to clean a surface that comes into contact with the tips of the pair of cleaning members 50. The illustrated cleaning members 50 may be squeegees, wherein the squeegees are configured to wipe a screen of the device 18 when disposed within the housing. The pair of cleaning members 50 are coupled to a carriage 52 and configured to support and position the pair of cleaning members during use.

The device storage case 10 includes a mechanical power drive band 28 disposed vertically within the housing 12 of the device storage case 10. The mechanical power drive band 28 is coupled to the carriage 52 and configured to provide mechanical movement thereto, and thereby to the pair of cleaning members 50. The mechanical power drive band 28 is configured to provide vertical movement to the carriage 52 and the pair of cleaning members 50. The mechanical power drive band 28 is coupled to a loading mechanism 30 configured to provide energy to move the band 28 in a vertical manner. The loading mechanism 30 is configured to generate and store energy as a device is disposed into the housing 12 of the device storage case 10. The device 18 actuates and compresses a bias member 34 disposed about the loading mechanism 30, thereby generating energy. Upon release of the bias member 34, the mechanical power drive band 28 is activated and the carriage 52 and the pair of cleaning members 50 move in a vertical, up and down, direction on the mechanical power drive band 28.

The device storage case 10 includes a locking mechanism 32 configured to lock and unlock the device from the loading mechanism 30 and the housing 12. The locking mechanism 32 is configured to engage and lock the device 18 within the housing 12, wherein the bias member 34 of the loading mechanism 30 is compressed. The locking mechanism 32 is configured to release the device 18 upon pressing down and decompressing the bias member 34, thereby activating the mechanical power drive band 28 and the pair of cleaning members 50. The locking mechanism 32 is configured to activate the mechanical power drive band 28 and the pair of cleaning members 50 when the device 18 is either inserted or removed from the housing 12 or both. The locking mechanism 32 includes a trigger mechanism 40 is configured to provide push lock and push unlock capabilities to the device storage case 10.

Figure 4:
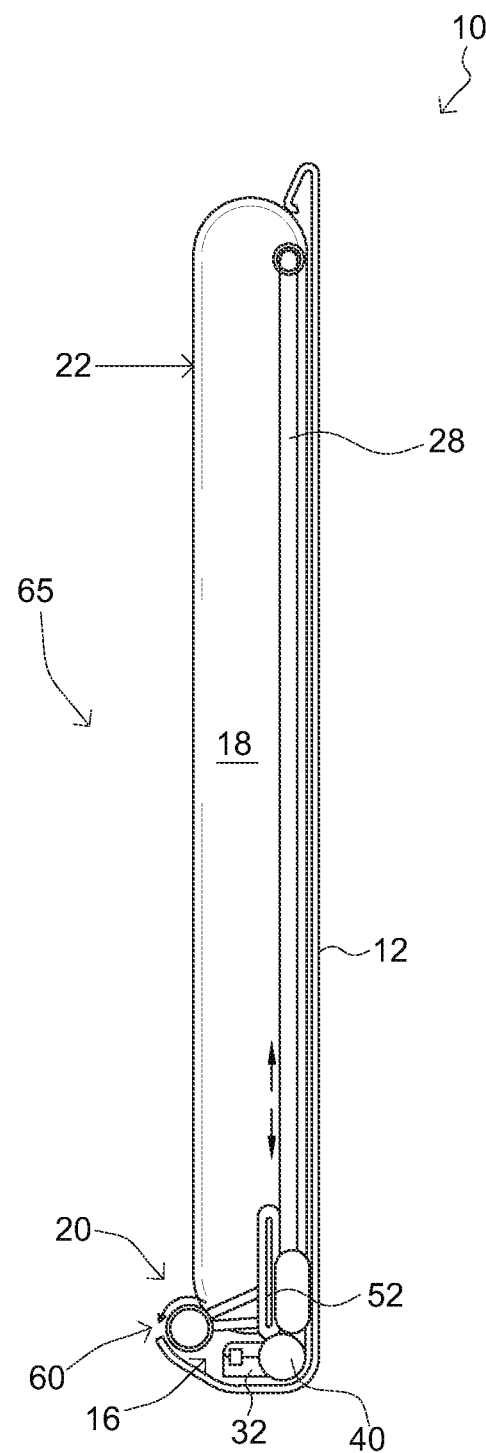
FIG. 4 is a side devotional cross-sectional view of a device storage case, according to one embodiment of the invention.

FIG. 4 is a side elevational cross-sectional view of a device storage case, according to one embodiment of the invention. There is shown a device 18 disposed within a device storage case 10 including a housing 12, a device engagement mechanism 16, a surface cleaning mechanism 20, a carriage 52, a locking mechanism 32, a trigger mechanism 40, and a cleaning roller 60 configured to reach around and travel up/down the surface of the device when actuated.

The illustrated device storage case 10 is configured to clean a surface or screen 22 of a phone or electronic device 18 disposed therein. The device storage case 10 includes a housing 12 having an open exterior side 65 and sized and shaped to support a phone or electronic device 18. The device storage case 10 includes a cleaning roller 60 configured to wipe/clean a surface or screen 22 of a phone or electronic device 18. The cleaning roller 60 is coupled to a carriage 52, wherein the carriage 52 is coupled to a mechanical power drive band 28 configured to move vertically therefrom. The cleaning roller pad 60 is configured to travel up and down on the band 28 to clean a surface 22 of the device 18.

The device storage case 10 includes a trigger mechanism 40 in communication with the mechanical power drive band 28 and configured to activate vertical movement of the cleaning roller 60. The trigger mechanism 40 is configured to actuate a locking mechanism 32 configured to operate the carriage 52 in a vertical direction.

According to one embodiment of the invention, there is a device storage case including a housing configured to support the components of the device storage case. The device storage case includes a device engagement device configured to secure a device to the housing of the device storage case. The device storage case includes a surface cleaning mechanism configured to clean a surface of the device. The surface cleaning mechanism may be configured to be manually operated, wherein a user manually operates the surface cleaning mechanism by manipulating a plurality of rollers of the surface cleaning device vertically about the device. The case may be a much configuration and size, and may not include electronically motorized modules or components. The user cleans the surface of the device by manipulating the surface cleaning mechanism, by vertically disposing a lever that is coupled to the surface cleaning mechanism, and is protruding through a side wall of the housing. The device storage case may be configured to not include any electronic components or modules and function on manual power and operation, according to one embodiment of the invention.

Figure 5:
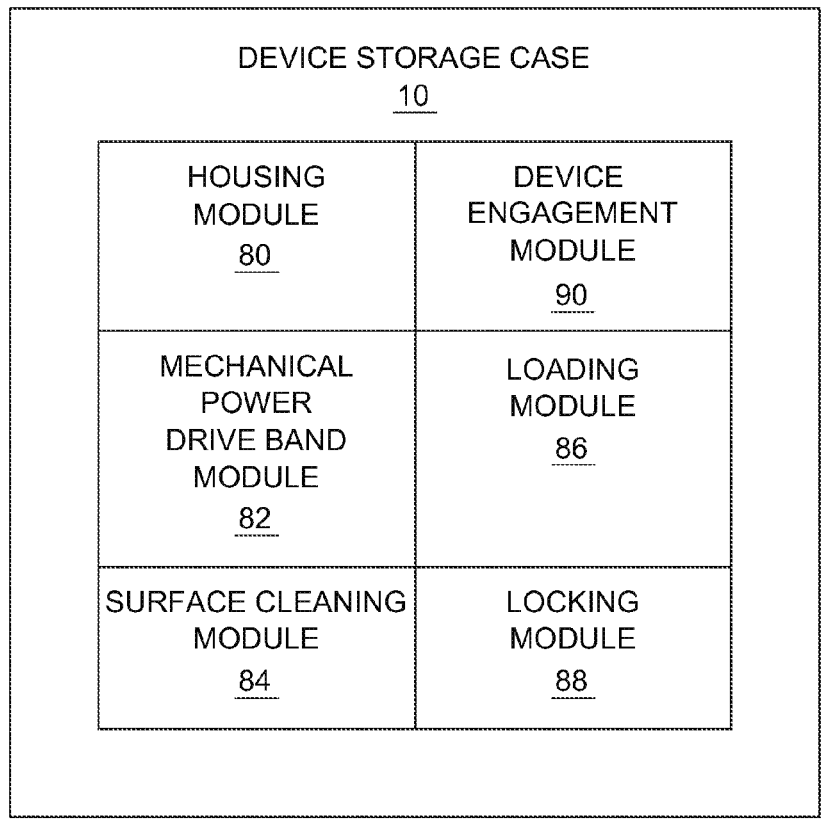
FIG. 5 is a module diagram of a device storage case, according to one embodiment of the invention.

FIG. 5 is a module diagram of a device storage case, according to one embodiment of the invention. There is shown a device storage case 10 including a housing module 80, a device engagement module 90, a surface cleaning module 84, a mechanism power drive band module 82, a loading module 86, and a locking module 88.

The illustrated device storage case 10 includes a housing module 80 configured to support the modules and components of the device storage case 10. The housing module 80 is sized and shaped to receive a phone or electronic device. The housing module may be configured to encase a phone or electronic device or the housing module may include an open exterior side, thereby encasing a portion of the phone or electronic device.

The device storage case 10 includes a surface cleaning module 84 configured to clean a surface or screen of a phone or electronic device. The surface cleaning module 84 includes, but is not limited to: cleaning pads, cleaning paddles, cleaning rollers, squeegees, etc. The surface cleaning module 84 is coupled to a mechanical power drive band module 82 configured to provide mechanical movement of the surface cleaning module 84 to clean a surface of a device. The mechanical power drive band module 82 includes, but is not limited to: a band drive, a gear belt, a carriage assembly, a track, a guide, etc. The surface cleaning module may include software/hardware controls and/or devices that control and/or effectuate cleaning of the surface of a device.

The device storage case 10 includes a loading module 86 configured to provide energy to move the mechanical power drive band module 82 and the surface cleaning module 84 over a surface or move the device in and out of the cavity of the housing module. The loading module 86 is configured to generate and store energy as a device is disposed into the cavity of the device storage case 10. The device actuates and compresses a bias member disposed within the loading module 86, thereby generating energy and securing the device within the cavity of the device storage case 10. Upon release of the bias member, by pressing down upon the device, the bias member is decompressed and the device is forced out of the cavity of the housing module 80. The surface cleaning module 84 is configured to wipe and/or clean a surface or screen of the phone or electronic device while the device is entering or exiting the cavity of the housing module or during both entry and exit from the housing module. The loading module may include software/hardware controls and/or devices that control and/or effectuate loading of a device.

The device storage case 10 includes a locking module 88 configured to selectably lock and unlock the device from the cavity of the housing module 80. The locking module 88 may be configured to activate the mechanical power drive band module 82 and transfer energy from the loading module 86 to the surface cleaning module 84 and thereby cleaning a surface or exterior surface of a phone or electronic device. The locking module may include software/hardware controls and/or devices that control and/or effectuate locking of a device.

The device storage case 10 includes a device engagement module 90 configured to couple to the housing module 80. The device engagement module 90 is in communication with the modules and components of the device storage case 10 and configured to convert mechanical power derived through user interaction with deposition of a device into a cavity of the housing module 80 to a form usable by the surface cleaning module 84. The device engagement module may include software/hardware controls and/or devices that control and/or effectuate engagement with and/or drawing power from mechanical motion of a device.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrated a housing having a top aperture, there may be multiple apertures and/or apertures may exist through regions not commonly referred to as the "top."

Additionally, although the figures illustrate specific cleaning mechanisms (rollers, wipers, etc.) there are other cleaning systems/mechanisms/structures/components that fall within the scope of the invention including but not limited to buffers, spinning pads, brushes, cleaning belts, disposable wipes, and the like and combinations thereof.

It is also envisioned that a variety of energy storage mechanisms may be used and that multiple systems may be used in conjunction with each other, such as but not limited to hydraulic, pressurized gas, electrochemical, photovoltaic, thermodynamic and the like and combinations thereof. It is expected that mechanical energy storage mechanisms such as but not limited to springs and other bias members are likely to be superior storage mechanisms as less energy is lost to waste in the conversion and/or storage thereof.

It is expected that there could be numerous variations of the design of this invention. An example is that the housing may be a rectangular box, circular, irregularly shaped, polygonal, stacked (multiple housings for storage of multiple devices), nested and the like and combinations thereof.

Finally, it is envisioned that the components of the device may be constructed of a variety of materials, including but not limited to metals, leather, textiles, fibers, ceramics, rubbers, plastics, polymers, natural materials, artificial materials, and the like and combinations and composites thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:
1. A device storage case, comprising:
a) a housing having a device access aperture;
b) a device engagement mechanism coupled to the housing and configured to convert mechanical power derived through user interaction with deposition of a device through the device access aperture to a form usable by the device storage case; and
c) a surface cleaning mechanism configured to clean a surface of the device that is disposed within the housing, functionally coupled to the device engagement mechanism such that the device engagement mechanism powers operation of the surface cleaning mechanism; wherein the surface cleaning mechanism includes a plurality of rollers functionally coupled to the device engagement mechanism and configured to clean the surface of the device when powered by the device engagement mechanism, and wherein the surface cleaning mechanism further includes a mechanical power drive band coupled to the plurality of rollers such that the mechanical power drive band causes the plurality of rollers to rotate.

2. The case of claim 1, wherein the plurality of rollers includes cleaning pads configured to clean the surface of the device.

3. The case of claim 1, wherein the device engagement mechanism includes a loading mechanism configured to store mechanical energy from only the movement of inserting or removing of the device from the device access aperture of the housing into a form of potential energy that can later be harnessed by the surface cleaning mechanism.

4. The case of claim 1, further comprising a locking mechanism disposed within the housing and configured to lock the device inside the housing.

5. The case of claim 1, wherein the device engagement mechanism includes a bias member functionally coupled to the surface cleaning mechanism and configured to convert mechanical power derived through user interaction with deposition of the device through the device access aperture into potential energy stored within the bias member.

6. The case of claim 1, wherein the housing includes a clip coupled to an exterior surface and configured to selectably couple to a user.

7. The case of claim 1, wherein the surface cleaning mechanism includes a trigger mechanism configured to activate delivery of potential energy stored in the device engagement mechanism to the surface cleaning mechanism and thereby clean the surface of the device engaged with the housing.

8. A device storage case, comprising:
a) a housing having a device access aperture;
b) a device engagement mechanism coupled to the housing and configured to convert mechanical power derived through user interaction with deposition of a device through the device access aperture to a form usable by the device storage case; and
c) a surface cleaning mechanism configured to clean a surface of the device that is disposed within the housing, functionally coupled to the device engagement mechanism such that the device engagement mechanism powers operation of the surface cleaning mechanism; wherein the device engagement mechanism includes a bias member functionally coupled to the surface cleaning mechanism and configured to convert mechanical power derived through user interaction with deposition of the device through the device access aperture into potential energy stored within the bias member; wherein the surface cleaning mechanism includes a plurality of rollers functionally coupled to the device engagement mechanism and configured to clean the surface of the device when powered by the device engagement mechanism, wherein the plurality of rollers includes cleaning pads configured to clean the surface of the device, and wherein the surface cleaning mechanism further includes a mechanical power drive band coupled to the plurality of rollers such that the mechanical power drive band causes the plurality of rollers to rotate.

9. The case of claim 8, wherein the device engagement mechanism includes a loading mechanism configured to store mechanical energy from only the movement of inserting or removing of the device from the device access aperture of the housing into a form of potential energy that can later be harnessed by the surface cleaning mechanism.

10. The case of claim 9, further comprising a locking mechanism disposed within the housing and configured to lock the device inside the housing.

11. The case of claim 10, wherein the housing includes a clip coupled to an exterior surface and configured to selectably couple to a user.

12. The case of claim 11, wherein the surface cleaning mechanism includes a trigger mechanism configured to activate delivery of potential energy stored in the device engagement mechanism to the surface cleaning mechanism and thereby clean the surface of a device engaged with the housing.

13. A device storage case, comprising:
   a) a housing having a device access aperture; wherein the housing includes a clip coupled to an exterior surface and configured to selectably couple to a user;
   b) a device engagement mechanism coupled to the housing and configured to convert mechanical power derived through user interaction with deposition of the device through the device access aperture to a form usable by the device storage case;
   c) a surface cleaning mechanism configured to clean a surface of a device that is disposed within the housing, functionally coupled to the device engagement mechanism such that the device engagement mechanism powers operation of the surface cleaning mechanism, the surface cleaning mechanism including:
      a plurality of rollers, including cleaning pads configured to clean the surface of the device, functionally coupled to the device engagement mechanism and configured to clean a surface of the device when powered by the device engagement mechanism, having:
         a loading mechanism configured to store mechanical energy from only the movement of inserting or removing of the device from the device access aperture of the housing into a form of potential energy that can later be harnessed by the surface cleaning mechanism; and
         a bias member functionally coupled to the surface cleaning mechanism and configured to convert mechanical power derived through user interaction with deposition of the device through the device access aperture into potential energy stored within the bias member;
      a mechanical power drive band coupled to the plurality of rollers such that the mechanical power drive causes the plurality of rollers to rotate; and
      a trigger mechanism configured to activate delivery of potential energy stored in the device engagement mechanism to the surface cleaning mechanism and thereby clean the surface of a device engaged with the housing; and
   d) a locking mechanism disposed within the housing and configured to lock the device inside the housing.

* * * * *